Patented June 23, 1931

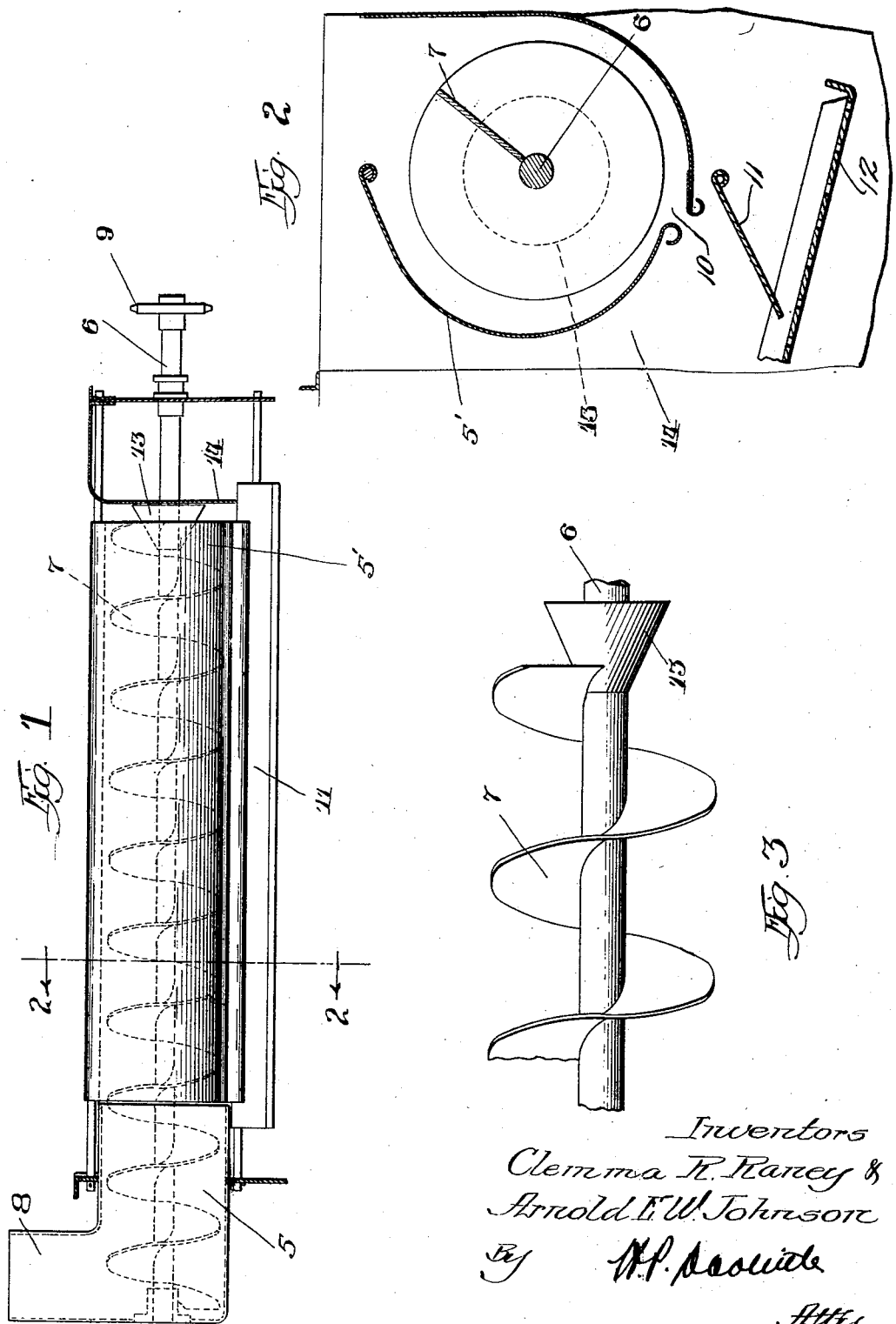

1,811,064

UNITED STATES PATENT OFFICE

CLEMMA R. RANEY, OF RIVERSIDE, AND ARNOLD E. W. JOHNSON, OF CHICAGO, ILLINOIS, ASSIGNORS TO INTERNATIONAL HARVESTER COMPANY, A CORPORATION OF NEW JERSEY

MATERIAL FEEDING MECHANISM

Application filed January 6, 1927. Serial No. 159,259.

This invention relates to an improvement in feeding mechanisms and particularly to an auger feeding mechanism such as used in distributing grain to the recleaner of a threshing machine. More particularly it relates to an improved auger feeding mechanism for use in the recleaner of a harvester thresher.

In the present disclosure, a practicable illustrative embodiment of the invention will be shown and described in connection with a material handling mechanism such as the recleaner auger feed of a harvester thresher, although it should be understood that the use of this invention is not necessarily limited to machines of this kind, as obviously the invention may be employed in connection with other forms of material handling apparatus adapted to feed grain or similar materials.

It is well known in the art that harvester threshers embody a threshing mechanism which includes a main threshing mechanism and a secondary, or recleaning, threshing mechanism, the material being conveyed from the first to the second of these mechanisms. Disposed above the second threshing mechanism there is a housing or hopper which receives the material from the first threshing mechanism and distributes the same evenly over the separating mechanism of the recleaner for the second cleaning operation. These housings or hoppers conventionally carry therein an auger or screw feeding mechanism which moves the material lengthwise of the hopper or housing, at the same time distributing the same over the separator mechanism of the recleaner. Frequently lengths of straw are mixed with the grain, and it has been found that these lengths of straw are carried along to the terminal end of the auger and there wind around the shaft which carries the auger. This is highly objectionable in practice as it interferes seriously with the even distribution of material from the hopper or housing to the recleaner.

Accordingly, the primary object of this invention is generally to improve the operation of material feeding mechanisms of the above type.

Still another object is to provide means associated with such feeding mechanism which will prevent winding of lengths of fibrous material around the shaft.

Other objects will be apparent to those skilled in this art as the description hereof progresses.

Briefly, these very desirable objects are accomplished by providing an auger feeding mechanism enclosed in a housing, which auger is carried on a shaft. The terminal end of the shaft, or that end of the same which is remote from the end of the hopper which receives the material, is formed with a shield device so correlated with the shaft and auger that winding of straw or similar materials around the shaft is effectively prevented, thereby resulting in an even distribution of the material from the housing or hopper. A preferred form of this invention is shown in the accompanying sheet of drawings, to which reference is now made, and wherein,—

Figure 1 is an elevational view showing the feeding housing or hopper of a harvester thresher recleaner;

Figure 2 is an end sectional view taken along the line 2—2 of Figure 1, as viewed in the direction of the arrows; and Figure 3 is an enlarged detail view showing the terminal end of the shaft and auger with the shield device thereon which prevents winding.

The improved feeding mechanism is generally shown in association with an elongated housing in the form of a hopper 5 in the end walls of which is journaled a horizontal shaft 6. Formed on this shaft is a conventional auger or screw feeding mechanism 7. The housing has a feed opening 8 at one end thereof so arranged that it will receive material to be recleaned, as will be understood. The shaft 6 may be driven by any suitable driving connections indicated generally by the sprocket wheel 9. In Figure 2 it will be noted that the housing 5 is closed along one side over the greater part of its length by a hinged wall 5' which is free to move away from the housing proper when the pressure of material going through the housing by means of the auger, forces the same back. This will occur when the housing is substantially full and the grain or other material will then be distributed evenly in a sheet through an opening or space 10 indicated in Figure 2.

The material will fall onto a guide board 11 which directs the same onto the recleaning mechanism in the form of a screen 12 indicated in Figure 2.

It is very important that the material be distributed evenly in a sheet through the opening 10 onto the guide board 11. In conventional devices this does not occur sometimes when straw, for example, mixed with the grain reaches the terminal end of the shaft 6, because the straw upon reaching that point has a tendency to, and does, wind around the shaft 6 and bunch up. This winding and bunching will interfere with the efficient operation of the auger and prevent an even distribution of grain fed from the housing. Means has accordingly been provided for overcoming this difficulty, said means being here shown in the form of a shield 13, generally conical in shape, and mounted on or forming part of the shaft 6 at the terminal end of the auger in such a manner (see Figure 3) that the final turn of the auger will overlap the smaller end of the conical portion or shield 13. Thus, straw reaching this point is prevented from winding on the shaft 6, as the inert space heretofore existing has been done away with and such straw as does get to the end of the auger will have to fall upon the board 11 between the end of the door 5' and an end wall of the housing shown at 14, as will be understood.

It can now be seen that grain or other material is received by the elongated housing or hopper 5 from the feed opening 8, and the auger 7 then moves the same through the housing 5 to the end wall thereof until the housing has been completely filled, whereupon the door or hinged wall 5' will swing back to form the opening 10 so that the grain may be spilled or distributed from the housing onto the board 11 and into the recleaner 12. The conical shield 13 is arranged in the space at the discharge end of the auger feeder in a manner to occupy the said space at that end of the shaft adjacent said end wall, the base end of the cone being next to the housing end wall and the apex of the cone being directed away from said end wall toward the shaft, whereby said cone occupies the space adjacent the end wall and thus effectively prevents winding of straw around the discharge end of shaft 6, as has been explained, and, as a consequence, even distribution of the material to the recleaner will be insured.

It is to be understood that only an illustrative embodiment of this invention has been herein disclosed and that the same is undoubtedly susceptible of changes and modifications without departing from the spirit and scope of this invention as indicated in the appended claim.

What is claimed as new is:

In a grain feeding mechanism, the combination of a distributor housing having an end wall and a straight shaft arranged horizontally in the housing and journaled in said end wall, a continuous auger feeder on the shaft within the housing to feed the material therethrough and toward said end wall, a substantially cone-shaped shield located at the terminal end of the housing and carried on the shaft in a manner substantially to fill the space at the said terminal end of the housing, the wide end of the conical shield being disposed closely adjacent to the end wall of the housing and rotating in close proximity thereto while the apex end of said conical shield is directed away from said end wall toward the shaft, whereby said shield functions to prevent winding of lengths of fibrous material around the discharge end of the shaft adjacent said end wall, and said auger having its terminal end flight continued partly to overlap the said conical shield.

In testimony whereof we affix our signatures.

CLEMMA R. RANEY,
ARNOLD E. W. JOHNSON.